United States Patent [19]
Boring

[11] Patent Number: 5,221,299
[45] Date of Patent: Jun. 22, 1993

[54] LOADING APPARATUS

[75] Inventor: Douglas J. Boring, Franklin, Pa.

[73] Assignee: The Conair Group, Inc., Pittsburgh, Pa.

[21] Appl. No.: 967,271

[22] Filed: Oct. 27, 1992

[51] Int. Cl.⁵ .............................................. B01D 45/12
[52] U.S. Cl. ........................................ 55/218; 55/1; 55/204; 55/459.1
[58] Field of Search ............... 55/218, 1, 52, 204, 55/459.1

[56] References Cited

U.S. PATENT DOCUMENTS 3,545,735 12/1970 Wolf et al. .................. 55/459.1 X
4,559,068 12/1985 Laqerstedt et al. ........... 55/459.1 X Primary Examiner—Charles Hart
Attorney, Agent, or Firm—Buchanan Ingersoll

[57] ABSTRACT

A loading apparatus is provided for receiving solid particulate material entrained in gas stream. The loading apparatus separates the particulate material, such as plastic pellets or plastic regrind, from the gas stream so that the particulate material is retained in the loading apparatus for subsequent loading into another receiving vessel or into an injection molding machine. The gas stream leaves the loading apparatus substantially free of particulate material. The entrained particulate material enters the generally cylindrical loading apparatus in a tangential direction and the reduction in speed of the gas stream causes the particulate material to fall out into the inverted frusto-conical lower section of the loading apparatus. Gas leaving the upper section of the loading apparatus is caused to reverse its circumferential flow before leaving the loading apparatus so that substantially all of the fines in the gas stream fall out into the body of the loading apparatus.

13 Claims, 3 Drawing Sheets

LOADING APPARATUS

BACKGROUND OF THE INVENTION

1. Field of the Invention

This invention is directed to a loading apparatus for particulate material that is conveyed, through conduits, in a gas stream. The loading apparatus separates the particulate material from the gas stream and stores the particulate material for subsequent discharge into a feed hopper or other vessel. The gas stream leaves the loading apparatus substantially free of particulate material.

2. Description of the Prior Art

In the plastics industry, particulate material such as plastic pellets or plastic regrind are often moved by an air stream in which the particulate material is entrained. The air stream is usually created by a vacuum pump that draws particulate material from a loading silo or other storage facility and conveys it to the feed hopper of an injection molding machine or to a intermediate storage facility for subsequent use.

In my earlier U.S. Pat. No. 4,200,415, I disclosed and claimed a material loading device to separate the entrained particulate material from the gas stream for loading into a feed hopper or the like. The present invention is directed to the solution of a similar problem, but offers a much simpler device which requires less maintenance and is more economical to build and to use.

Separating devices for separating entrained fluids or solids from gas streams are known in the art. Some of these devices bear a superficial resemblance to some features of the present invention. Examples of patents disclosing separators for removing solids or fluids from a gas stream are: U.S. Pat. Nos. 1,784,664; 1,908,181; 2,236,548; 2,354,677; 2,354,678; 3,684,093; Canadian No. 556,025; and Japanese No. 47-13225.

Many prior systems in the plastics industry for separating particulate material from moving gas streams included filters to remove the particulate fines. The filter material in prior loaders often became clogged and required extensive maintenance. Because the loaders were well above floor height, maintenance personnel had to climb ladders several times a day to maintain the filters in a condition where the gas stream could flow efficiently through them. My present invention eliminates the use of filters in the loader, thereby greatly reducing the maintenance required and also reducing the risk to maintenance personnel of climbing to heights in order to maintain the loaders.

SUMMARY OF THE INVENTION

In accordance with the present invention, there is provided a loading apparatus for receiving particulate material entrained in a gas stream and retaining the particulate material for subsequent loading into a designated vessel while removing the gas stream substantially free from entrained particulate material. The loading apparatus includes a vertically oriented, closed cylindrical body having an inverted frusto-conical lower section with a tangential inlet conduit formed in the cylindrical body. The gas and entrained solids entering the tangential inlet conduit move around the interior of the cylindrical body in a first circumferential direction. A cap member covers the top of the cylindrical body. An annular plate is sealingly positioned between the cylindrical body and the cap member. A spiral-wound gas receiving outlet communicates with the space between the annular plate and the cap member and extends below the annular plate into the cylindrical body. The gas receiving outlet has a closed lower end and a vertical slot-like opening positioned within the cylindrical body to receive gas that is forced to move within the gas receiving outlet in a second circumferential direction opposite to the first circumferential direction of the gas moving in the cylindrical body. A gas withdrawal conduit communicates with the cap member to remove gas from the loading apparatus. A valve is positioned in the lower portion of the particulate material in the lower section and to release the particulate material for subsequent use when open.

Accordingly, it is an object of this invention to provide a new and improved material loading apparatus for particulate material.

Another object of the present invention is to provide an efficient means for separating the fines associated with the particulate material from the gas stream which carries them.

Another object of the present invention is to provide a material loading apparatus which has no filters at elevated heights, but which may utilize filtering at floor level.

These and other objects of the present invention will be more completely disclosed and described as this description proceeds in conjunction with the accompanying drawings and appended claims.

DESCRIPTION OF THE PREFERRED EMBODIMENT

Figure 1:
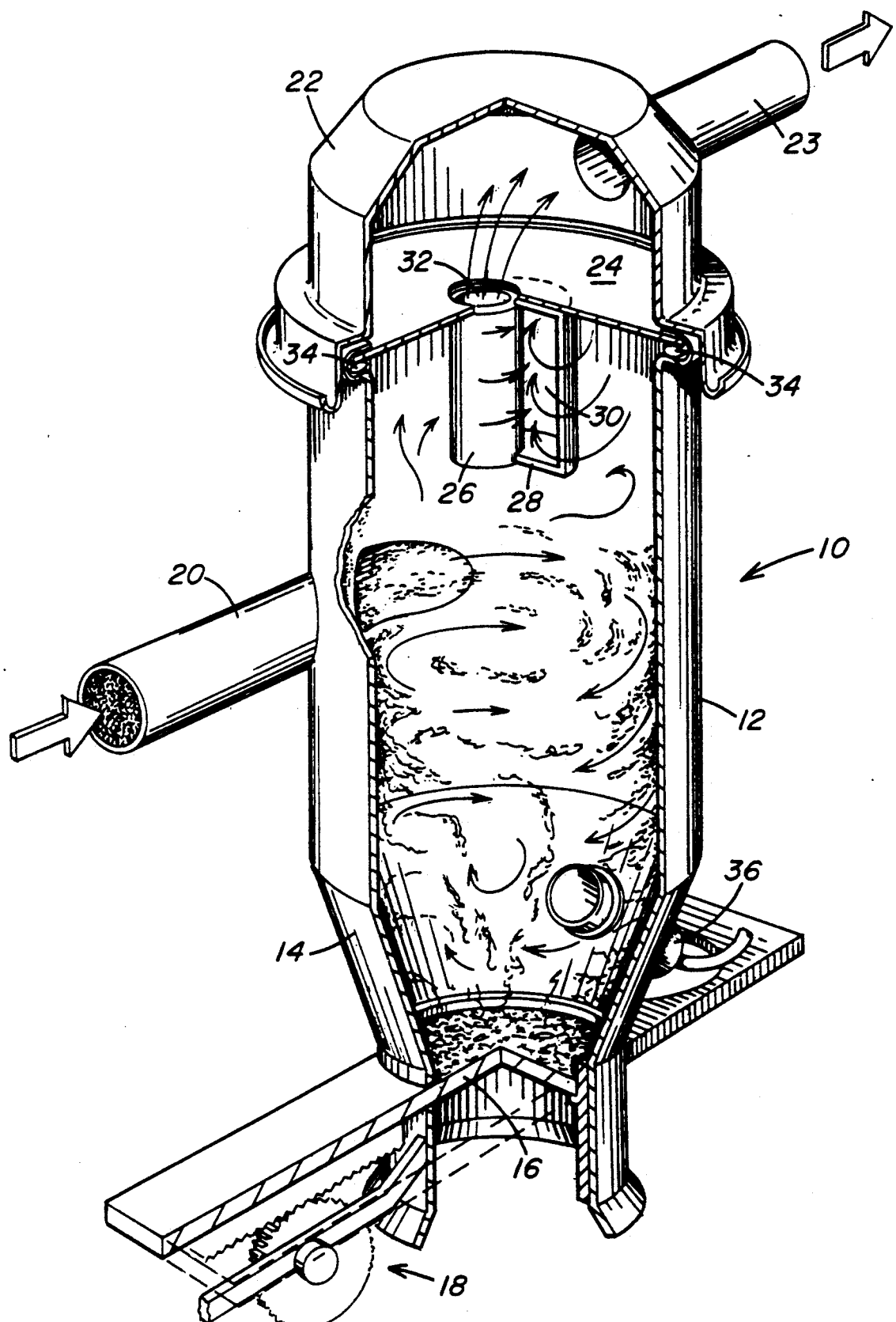
FIG. 1 is a perspective cut-away view of the loading apparatus of the present invention.
Figure 3:
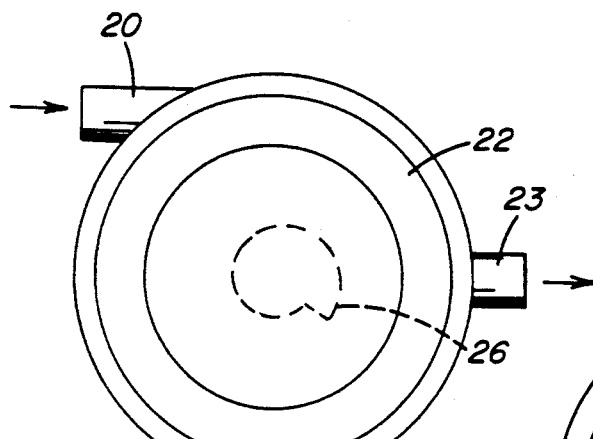
FIG. 3 is a top plan view of the loading apparatus of FIG. 2.

Referring to the drawings, there is shown a loading apparatus 10 that has a cylindrical body 12 with an inverted frusto-conical lower section 14 integral therewith. At the bottom of the frusto-conical section 14 is a suitable gate valve 16 operated by a valve operating mechanism indicated generally at 18. The specific type of valve and valve operator form no part of the present invention.

Figure 5:
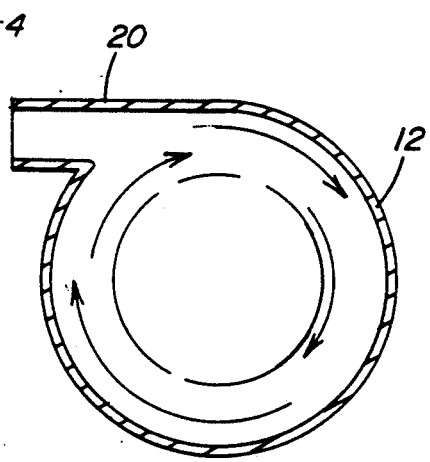
FIG. 5 is a sectional view taken along line 5—5 of FIG. 2.

A tangential inlet 20 is formed in the cylindrical body so that a gas stream entering cylindrical body 12 enters tangentially to the internal cylindrical surface of body 12 and proceeds around the body in a first circumferential direction, clockwise as viewed in FIG. 5. A cap member 22 encloses the top of cylindrical body 12. The cap member 22 has an outlet conduit 23 that communicates with the interior of cap member 22.

An annular plate 24 is positioned between the cap member 22 and the cylindrical body 12. Annular plate 24 supports a spiral-wound gas receiving outlet 26 that opens into the space between cap member 22 and annular plate 24. The ga receiving outlet 26 has a lower end wall 28 which closes the end of the outlet 26. An outlet port 30 which is of a slot-type is positioned below annular plate 24 within the cylindrical body 12. A seal 34 is provided around the periphery of annular plate 24 to seal it between the cap member 22 and the cylindrical body 12.

Figure 4:
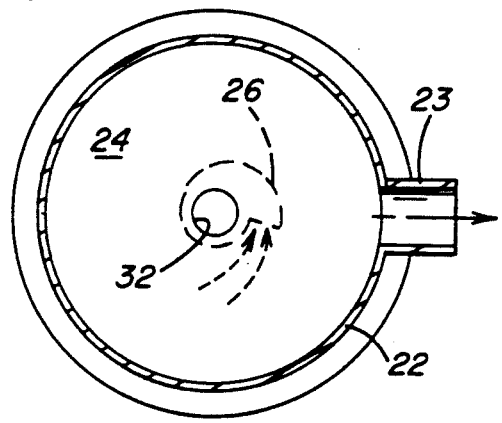
FIG. 4 is a sectional view taken along line 4—4 of FIG. 2.
Figure 2:
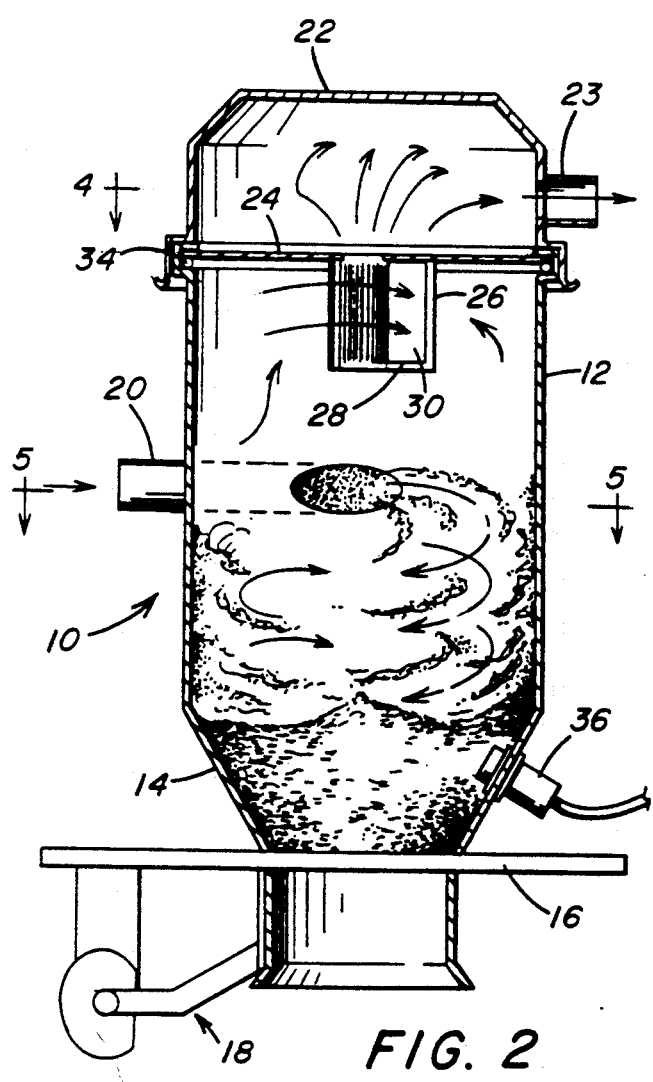
FIG. 2 is an elevation, in section, of the loading apparatus.

Because of the spiral nature of the bas receiving outlet 26, the gas entering the outlet 26 must flow in a second circumferential direction which is opposite to the direction of flow of gas entering tangential inlet 20 of cylindrical body 12. As seen in FIG. 4, the flow of gas into the outlet 26 is counter clockwise when viewed from the top of the loading apparatus.

Located in the lower frusto-conical section 14 of cylindrical body 12 is a fill sensor 36 which determines the amount of particulate material accumulated in the bottom of the loading apparatus 10 at any time. The fill sensor 36 provides a signal to stop the flow of gas into the loading apparatus 10 when the articulate material in the frusto-conical lower section 14 accumulates to the point where the loading apparatus can no longer operate efficiently to withdraw the particulate material from the gas stream. After particulate material that has accumulated within section 14 is dumped by opening valve 16, the fill sensor 36 permits additional material to be drawn through tangential inlet 20 to reload the loading apparatus 10.

In operation of the loading apparatus 10, the particulate material which may be plastic pellets or plastic regrind, is entrained in a gas stream which enters through tangential inlet 20. As the gas begins to move in a clockwise direction as viewed in FIG. 5, the heavier entrained particulate material falls out of the moving gas stream. The finer particulate material may continue to be carried in the circumferentially moving gas stream. The gas stream can leave the cylindrical body 12 only through the spiral-wound gas receiving outlet 26 which causes the gas flowing within the cylindrical body 12 to reverse its circumferential direction before it moves upwardly into the space between cap member 22 and annular plate 24. The reversal of direction of the gas within cylindrical body 12 causes substantially all of the fines carried by the gas stream to fall out of the gas stream and into the lower section 14 of cylindrical body 12. The gas leaving through outlet conduit 23 is substantially free of particulate material.

Figure 6:
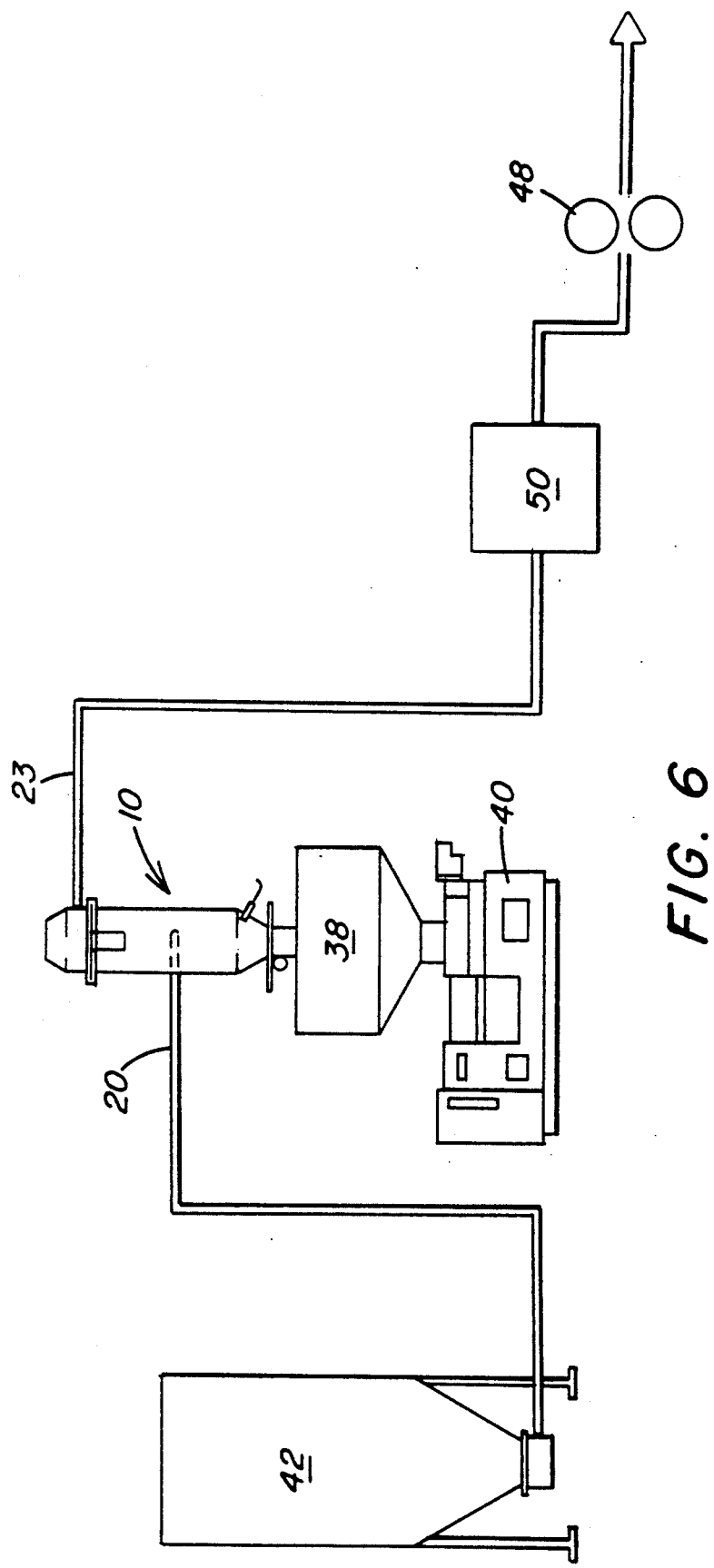
FIG. 6 is a schematic representation of the loading apparatus of the present invention positioned in a plastic manufacturing production line.

FIG. 6 is a schematic representation of the loading apparatus 10 of the present invention being used to fill the feed hopper 38 of a plastic injection molding machine 40. Plastic pellets are stored in a storage silo 42 to which the tangential inlet 20 of loading apparatus 10 is connected. The outlet conduit 23 from loading apparatus 10 passes through a filter 50 to a vacuum pump 48. Vacuum pump 48, when operated, creates a suction which draws an air stream through tangential inlet 20 and outlet conduit 23. Pellets from silo 42 are entrained in the air stream and moved to loading apparatus 10. As the air stream passes through the loading apparatus 10, the pellets are caused to accumulate in the inverted frusto-conical section of the loading apparatus body.

As may be required by the operating schedule of injection molding machine 40, the pellets are periodically emptied from the loading apparatus 10 into the feed hopper 38 which feeds the injection molding machine 40. If the fill sensor 36 indicates that the loading apparatus 10 is becoming over full, the air stream is stopped until the loading apparatus 10 can be emptied. It will be appreciated that the loading apparatus 10 receives particulate material entrained in the air streamed only when the valve 16 is in a closed position since the opening of valve 16 destroys the vacuum that causes flow from silo 42 through the inlet 20, outlet conduit 23, filter 50 to vacuum pump 48. There is only one source of power for the air stream and that is vacuum pump 48. It will be appreciated that the loading apparatus 10 would function in the same manner if the air stream entering inlet 20 was forced by a pressure pump rather than being drawn into inlet 20 by a vacuum pump.

If any fines escape the loading apparatus 10, the filter 50 stops them before they reach vacuum pump 48. Filter 50 is located at or near ground level so that it may be easily maintained by service personnel. Because loading apparatus 10 removes substantially all the fines from the air stream leaving the loading apparatus, filter 50 requires very little maintenance as compared with those filters that are an integral part of prior loaders.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise then as specifically illustrated and described.

I claim:

1. Loading apparatus for receiving solid particulate material entrained in a gas stream and retaining said particulate material for subsequent loading into a designated vessel while removing said gas stream substantially free from entrained particulate material comprising:

a vertically oriented closed cylindrical body having an inverted frusto-conical lower section with a tangential inlet conduit formed in said cylindrical body whereby gas and entrained solids entering said tangential inlet conduit move in a first circumferential direction around the interior of said cylindrical body;

a gas receiving outlet within said cylindrical body, said gas receiving outlet having means to force reversal of gas flow within said receiving outlet so that gas leaving through said outlet has a second circumferential direction of flow opposite to said first circumferential direction of flow;

a gas withdrawal conduit communicating with said gas receiving outlet to remove gas from said loading apparatus; and valve means positioned in the lower portion of said cylindrical body frusto-conical lower section to retain said particulate material in said lower section and to release said particulate material for subsequent use.

2. The loading apparatus of claim 1 wherein a fill sensor is provided to prevent said loading apparatus from becoming over-full with particulate material.

3. The loading apparatus of claim 1 wherein said gas stream is moved by a single power source into said tangential inlet conduit and out through said gas withdrawal conduit.

4. The loading apparatus of claim 1 wherein said gas receiving outlet comprises a spiral-wound body with a gas receiving slot formed vertically therein.

5. The loading apparatus of claim 2 wherein said valve means is operated in response to said fill sensor to prevent over-filling of said loading apparatus.

6. The loading apparatus of claim 3 wherein said single power source is a vacuum pump.

7. Loading apparatus for receiving solid particulate material entrained in a gas stream and retaining said particulate material for subsequent loading into a designated vessel while removing said gas stream substantially free from entrained particulate material comprising:
- a vertically oriented closed cylindrical body having an inverted frusto-conical lower section with a tangential inlet conduit formed in said cylindrical body whereby gas and entrained solids entering said tangential inlet conduit move in a first circumferential direction around the interior of said cylindrical body;
- a cap member covering the top of said cylindrical body;
- an annular plate sealingly retained between said cylindrical body and said cap member;
- a spiral-wound gas receiving outlet communicating with the space between said annular plate and said cap member and extending below said annular plate into said cylindrical body, said gas receiving outlet having a closed lower end and a vertical slot-type opening positioned within said cylindrical body to receive gas that is forced to move within said gas receiving outlet in a second circumferential direction opposite to said first circumferential direction;
- a gas withdrawal conduit communicating with said cap member to remove gas from said loading apparatus; and
- valve means positioned in the lower portion of said cylindrical body frusto-conical lower section to retain said particulate material in said lower section and to release said particulate material for subsequent use.

8. The loading apparatus of claim 1 wherein a fill sensor is provided to prevent said loading apparatus from becoming over-full with particulate material.

9. The loading apparatus of claim 1 wherein said gas stream is moved by a single power source into said tangential inlet conduit and out through said gas withdrawal conduit.

10. The loading apparatus of claim 8 wherein said valve means is operated in response to said fill sensor to prevent over-filing of said loading apparatus.

11. The loading apparatus of claim 9 wherein said single power source is a vacuum pump.

12. The loading apparatus of claim 7 wherein said particulate material is plastic pellets.

13. The loading apparatus of claim 7 wherein said particulate material is plastic regrind.

* * * * *